March 7, 1944. E. SCHUFFTAN 2,343,586
PROCESS AND APPARATUS FOR ELIMINATING GRAINING IN PHOTOGRAPHY
Filed Dec. 16, 1941
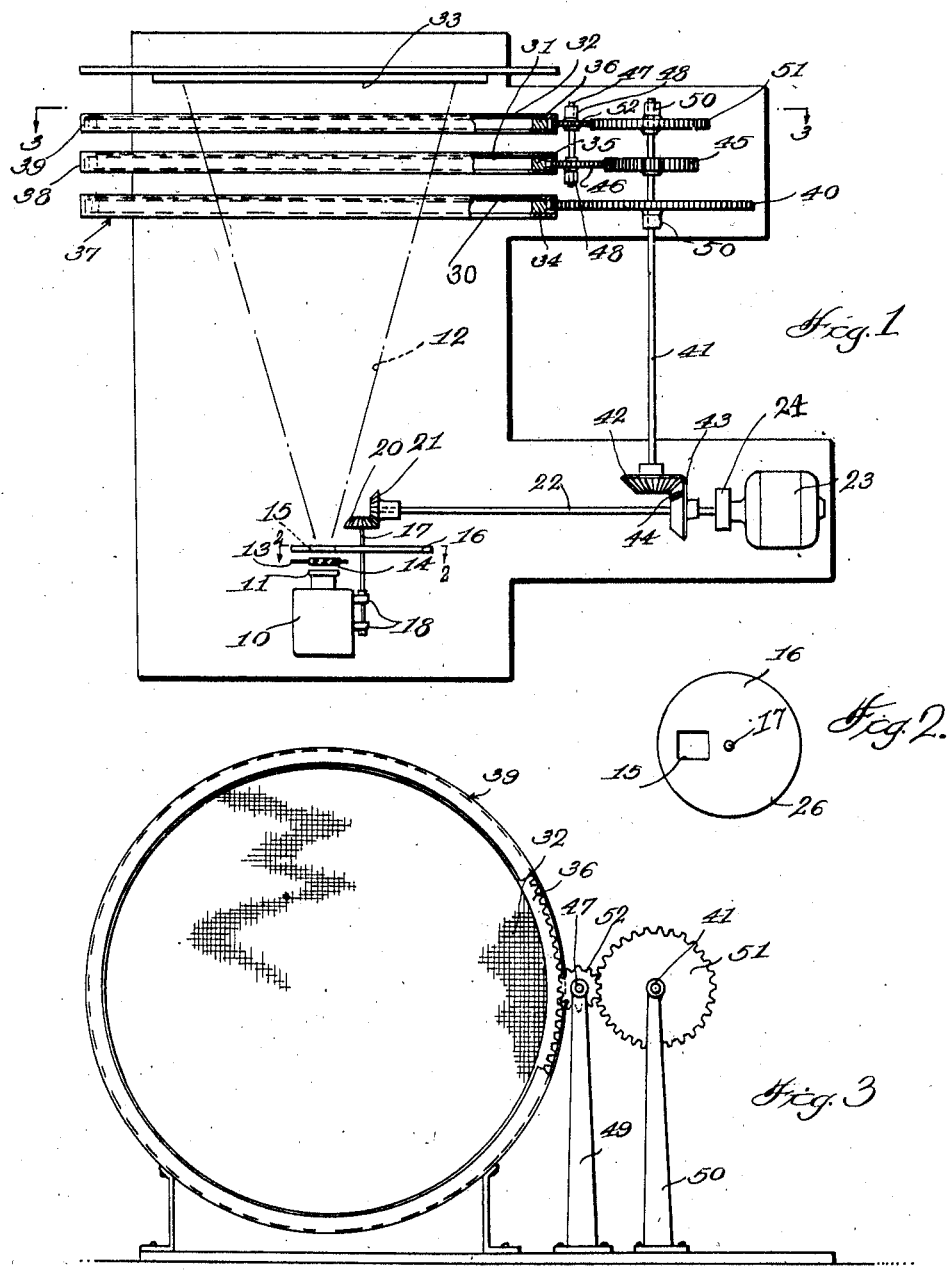
INVENTOR
Eugen Schufftan
BY
Munn, Liddy, Glaccum & Kane
ATTORNEY Patented Mar. 7, 1944

2,343,586

UNITED STATES PATENT OFFICE 2,343,586

PROCESS AND APPARATUS FOR ELIMINATING GRAINING IN PHOTOGRAPHY

Eugen Schufftan, New York, N. Y., assignor of forty-five percent to Ludwig L. Lawrence, Locust Valley, N. Y., ten percent to John J. Lipow, Los Angeles, Calif., and forty-five percent to himself Application December 16, 1941, Serial No. 423,238

8 Claims. (Cl. 95—5)

This invention relates to a process and apparatus for eliminating graining in photography.

In attempting to remove by various methods the graining effect produced when the very small frames of a moving picture film are enlarged for use as stills, or when negatives or positives are reproduced in the same size, it has been found that the stills are too indistinct and worthless for reproduction in newspapers and magazines. On the other hand, when the frames are enlarged without any precaution, the grains of the film are also greatly magnified, thus giving a spotty appearance to the enlargements.

An object of the present invention is the provision of a process for removing objectionable graining during the reproduction of photographs from negatives or positives, said process including the projection of light rays periodically through the negative or a dia-positive and also through varying positions of a stationary screen and on to a sensitized surface until the graining effect and the pattern of the screen are entirely eliminated.

Another object of the invention is the provision of a process for eliminating graining in reproduction, which process includes the exposure of a sensitized surface to light rays passing through a plurality of screens while the screens are at rest after which the sensitized surface is shielded and the screens are moved relative to each other so that upon the next exposure a different pattern in the screen will be provided for succeeding exposures.

A further object of the invention is the provision of a process for eliminating graining by recording or reproducing a succession of varying patterns on an exposed sensitized surface when the surface is exposed to the light rays passing through a dia-positive or negative, the reproduction being of the same size or enlarged with the light rays passing through a plurality of screens which are maintained stationary during the exposures, but which are moved relative to each other when the light source has been cut off from the sensitized surface so that when the reproduction has been completed, the graining and pattern of the screen will remain practically unnoticed in the final effect.

A still further object of the invention is the provision of eliminating graining during the photographic or cinematographic reproduction or reproduction of photographic or moving picture films and other similar recordings in which a pattern varying in successive stages is simultaneously reproduced or projected on the picture in such a manner that the grain in the reproduction is minimized to such an extent that the grainy effect will have disappeared whilst the pattern of the various screen effects will be destroyed also in the final product.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a view in elevation of an apparatus for carrying out my process.

Figure 2 is a horizontal section taken along the line 2—2 of Fig. 1.

Figure 3 is a horizontal section taken along the line 3—3 of Fig. 1.

Referring more particularly to the drawing, 10 designates a camera having a light source therein (not shown) having a lens combination 11 for causing divergent light rays 12 to be projected through a film 13 supported by a holder 14 carried by the camera 10 which is desired to obtain an enlarged reproduction. Nevertheless, when the reproduction is the same size as the original, these rays are passed in parallel relation.

The light rays are projected through an opening 15 in a shutter 16 which is rigidly secured to a shaft 17 having bearings 18 carried by the camera 10. However, the shaft may be supported in bearings which are mounted independently of the camera.

The disk 16 is driven continuously in one direction by means of a gear 20 secured to the shaft 17 and a gear 21 secured to a shaft 22, so that the opening 15 will aline with the film once every revolution of the disk 16 and the gears 20 and 21. If desired more than one opening may be employed. The shaft 22 is driven by a motor 23 and a transmission gearing 24. The transmission controls the speed of the shaft 22 and likewise of the shaft 17.

Three screens generally designated by the numerals 30, 31 and 32 are disposed in parallel relation to each other and likewise in parallel relation with a sensitized surface 33. These screens are carried respectively by frames 34, 35 and 36, which are in effect ring gears. The ring gears are mounted in circular bearings generally designated by the respective numerals 37,

38 and 39. These bearings are supported in any improved manner above the camera 10.

While these screens are shown, less than this number may be employed, because one screen of the proper mesh and at the correct distance from the sensitized surface may be used with satisfactory results. The periodically changed positions of the single screen will not only eliminate the graining effect but will also obliterate the pattern of the screen itself after a predetermined number of exposures.

A gear 40 is secured to a shaft 41 which has a gear 42 secured thereto meshing with a gear 43. The last mentioned gear has one tooth 44 which engages the teeth on the gear 42 once every revolution of the gear or rotatable member 43 so that as the shaft 22 is revolved, the gear 42 will be periodically rotated through a predetermined angle as will be the shaft 41. Since gear 40 meshes with the ring gear 34 the said ring gear will be rotated intermittently and through a predetermined angle. At the same time that the ring gear 34 is slightly revolved the disk 16 will be revolving, but the opening 15 will not be in operative relation with the film 13. The position of the tooth 43 has a particular position on the member 43 with respect to the position of the opening 15 in the disk 16 so that after said opening has been alined with the film 13 for exposing the sensitized surface to the light rays and has passed beyond the exposing position, the tooth 44 will engage the teeth of the gear 42 and thus slightly rotate said gear and the screens thus providing for a new pattern for the next exposure when the screens are at rest. At no time during the exposures are the screens moved.

A gear 45 is also secured to the shaft 41 above the gear 40 and this gear meshes with an idler gear 46 attached to a shaft 47 which in turn is mounted in bearings 48 supported in any approved manner by means of brackets 49. Similar brackets 50 support the upper end of the shaft 41. The idler gear 46 meshes with the ring gear 35.

A gear 51 meshes with an idler gear 52 secured to the shaft 47. This idler gear in turn meshes with the ring gear 36 which forms the framework for the screen 32.

The operation of the device is as follows: A negative or dia-positive 13 is placed in the holder 14 so that the divergent rays of light will pass through the negative or dia-positive and through the opening 15 and after passing through the screens 30, 31 and 32 will affect the sensitized surface 33. When more than one opening 15 is employed in the disk, then a like number of teeth are formed on the member 43 and in proper position so that the rotation of the shaft 22 will cause a number of angular rotations of the gear 42 and exposures during each complete rotation of the disk 16 and member 43 but no exposures are made during the angular rotations of the screen when new forms of patterns are made. Thus it will be seen that the sensitized surface 33 is subjected to a number of exposures and it will thus be affected by varying patterns formed by different positions of the plurality of screens 30, 31 and 32 until not only the graining effect in the film 13 has been eliminated but the patterns themselves will be rendered entirely imperceptible in the reproduction.

During the movement of the screens, however, the opening 15 will not register with the axis of the camera 10 so that the light rays will be cut off to the sensitized surface 33 each time that the screens are moved, and thus the screens are only moved between each series of exposures of the sensitized surface.

Since the gear wheel 40 is larger than the gear wheels 45 and 41 there will be a differential rotation between the screens 30 and 31, 32. Furthermore, since the idlers 46 and 48 are respectively located between the gears 45, 35 and 51, 36, the last two mentioned screens will be reversely rotated with respect to the screen 30. Thus it will be seen that after each angular rotation of the screens a different pattern will be provided. Furthermore, the screens 35 and 36 may be advanced to an angle of 45 degrees with respect to a similar pattern in screen 30. Nevertheless screen 30 has the coarsest mesh while screens 31 and 32 have a finer mesh. The last two mentioned screens may have substantially the same mesh or screen 32 may have a finer mesh than screen 31. The screens are graded in fineness as they approach the sensitized surface 33 with the coarser screen being farther away from the sensitized surface while the finer mesh screens are nearer said surface.

When only one screen is employed, the other screens are removed from their annular bearings and it may be necessary to make a greater number of exposures than when a plurality of screens are used. In any event, a sufficient number of exposures in each case will be required to cause the pattern of the screens as such to disappear in the final product.

When the first exposure is made the pattern of the screen in its first position, is imprinted on the sensitized surface. The screen or screens are then slightly displaced from the initial position and the surface is exposed a second time. The screen displacements and alternate exposure are continued until the graining and prior patterns have been blended out while the lights and shadows which give character to the picture are maintained.

The screens may be made in different ways.

In actual practice the screens are close together but substantially out of contact although in the drawing they are spaced sufficiently apart for the purposes of illustration. When said screens are placed in their respective bearings 37, 38 and 39, screen 31 is turned so that lines therein are located at approximately 45 degrees from similarly placed lines in screen 30. Screen 32 may be turned relative to screen 31 so that similarly placed lines in both screens will be at an angle of 45 degrees to each other.

The pattern of the screen may have a regular or irregular form or it may be composed of a number of forms. The screens employed may be of the diffraction grating type or they may be phosphor-bronze wire gauze screens. The screens may also be made photographically in which a thin film of emulsion is provided with grains. It is also possible to form a thin film of emulsion in the wire gauze screen. Matt emulsions should be used to reduce reflection of the screens on to the reproduction.

The tooth 44 and the wheel 43 in connection with the gear 42 constitute in effect the well known Geneva movement in which a star wheel is provided with a slot or slots and adapted to be rotated for receiving a pin on a member which is adapted to be rotated periodically.

I claim:

1. The method of making negatives from which printing plates may be produced while eliminating blemishes in the original frames of a motion picture film which consists in making successive exposures of a sensitized surface through a plurality of screens while the screens are at rest and moving the screens relative to each other between the exposures for varying the pattern of the screens.

2. The method of printing negatives from which printing plates may be produced which consists in making successive exposures of a sensitized surface through a plurality of screens of different mesh while the screens are at rest and moving the screens relative to each other between the exposures.

3. The method of making negatives from which printing plates may be produced which consists in making successive exposures of a sensitized surface through screens having a definite pattern while the screens are at rest then changing the positions of the screens to vary the pattern and making successive exposures through the varied patterns of the screens while said screens are at rest.

4. The method of making enlarged reproductions of moving picture frames from which printing plates may be produced which consists in exposing a sensitized surface to divergent light rays passing through a frame and through a plurality of screens while the screens are at rest, cutting off the light rays and moving the screens relative to each other to vary the pattern, then continuing the exposures, cutting off the light rays and varying the pattern in alternation a plurality of times.

5. The method of eliminating blemishes in reproduction while making an enlarged reproduction of a frame of a moving picture film from which printing plates may be produced which consists in making a series of successive exposures of a sensitized surface through a plurality of screens while at rest, each screen having a different pattern and moving certain of the screens while shielding the sensitized surface after each series of exposures.

6. An apparatus for making a reproduction of a negative with blemishes eliminated comprising a plurality of screen holders located in parallel relation, a screen in each holder, means for periodically rotating the screens at different speeds and through predetermined angles, means for projecting light rays through a film and the screens and on to a sensitized surface, means controlling the projection of the light rays periodically through the film and screen when the screens are at rest, and means actuated by the rotating means for causing operation of the controlling means.

7. An apparatus for making a reproduction of a negative with the graining effect eliminated comprising a screen located in parallel relation with a sensitized surface, means for periodically rotating the screen through predetermined angles, means for projecting light rays through the negative and screen and onto the sensitized surface, means for cutting off the light rays when the screen is rotated through a predetermined angle and means actuated by the rotating means for causing operation of the last mentioned means for cutting off the light rays when the screen is rotated and for letting the light rays pass through the negative and screens when the screen is stationary.

8. The method of making negatives from which printing plates may be produced, while eliminating blemishes in the negatives, which consists in making successive exposures of a sensitized surface through a screening device composed of a plurality of elements, while said screening device is at rest and moving an element of the screening device between the successive exposures to vary the pattern of the screening device after each exposure.

EUGEN SCHUFFTAN.